United States Patent [19]
Smith et al.

[11] Patent Number: 5,917,006
[45] Date of Patent: Jun. 29, 1999

[54] OPTICAL RESIN COMPOSITION

[75] Inventors: Robert A. Smith, Murrysville; Robert D. Herold, Monroeville; Michael O. Okoroafor, Export, all of Pa.

[73] Assignee: PPG Industries Ohio, Inc., Cleveland, Ohio

[21] Appl. No.: 09/008,222

[22] Filed: Jan. 16, 1998

[51] Int. Cl.⁶ .................................................. C08G 75/00
[52] U.S. Cl. ..................... 528/373; 525/181; 525/191; 525/212; 351/159
[58] Field of Search .................. 528/373; 525/212; 525/181, 191; 351/159

[56] References Cited

U.S. PATENT DOCUMENTS

| | | | |
|---|---|---|---|
| 3,361,706 | 1/1968 | Meriwether et al | 260/39 |
| 3,562,172 | 2/1971 | Ono et al. | 252/300 |
| 3,567,605 | 3/1971 | Becker | 204/158 |
| 3,578,602 | 5/1971 | Ono et al. | 252/300 |
| 4,166,043 | 8/1979 | Uhlmann et al. | 252/300 |
| 4,215,010 | 7/1980 | Hovey et al. | 252/300 |
| 4,342,668 | 8/1982 | Hovey et al. | 252/586 |
| 4,367,170 | 1/1983 | Uhlmann et al. | 252/586 |
| 4,637,698 | 1/1987 | Kwak et al. | 351/163 |
| 4,816,584 | 3/1989 | Kwak et al. | 344/71 |
| 4,818,096 | 4/1989 | Heller et al. | 351/163 |
| 4,826,977 | 5/1989 | Heller et al. | 544/70 |
| 4,880,667 | 11/1989 | Welch | 427/160 |
| 4,931,219 | 6/1990 | Kwiatkowski et al. | 252/586 |
| 4,931,220 | 6/1990 | Haynes et al. | 252/586 |
| 5,066,818 | 11/1991 | Gemert et al. | 549/389 |
| 5,238,931 | 8/1993 | Yoshikawa et al. | 514/184 |
| 5,274,132 | 12/1993 | VanGemert | 549/389 |
| 5,384,077 | 1/1995 | Knowles | 252/586 |
| 5,405,958 | 4/1995 | VanGemert | 544/71 |
| 5,429,774 | 7/1995 | Kumar | 252/586 |
| 5,446,173 | 8/1995 | Kanesaki et al. | 549/13 |
| 5,466,398 | 11/1995 | Van Gemert et al. | 252/586 |
| 5,475,074 | 12/1995 | Matsuoka et al. | 526/336 |
| 5,484,872 | 1/1996 | Kanesaki et al. | 528/73 |
| 5,502,139 | 3/1996 | Toh et al. | 526/284 |

FOREIGN PATENT DOCUMENTS

| | | |
|---|---|---|
| 562966 A2 | 9/1993 | European Pat. Off. . |
| 598551 A2 | 5/1994 | European Pat. Off. . |
| 598552 A2 | 5/1994 | European Pat. Off. . |
| 742244 A2 | 11/1996 | European Pat. Off. . |
| 802208 A1 | 10/1997 | European Pat. Off. . |
| 803504 A2 | 10/1997 | European Pat. Off. . |
| 62-50336 | 3/1987 | Japan . |
| 62-195383 | 8/1987 | Japan . |
| 1-182314 | 7/1989 | Japan . |
| 1-197528 | 8/1989 | Japan . |
| 2-283731 | 11/1990 | Japan . |
| WO 96/14594 | 5/1996 | WIPO . |
| WO 96/38486 | 12/1996 | WIPO . |

OTHER PUBLICATIONS

*Techniques in Chemistry*, vol. III, "Photochromism," Chapter 3, Glenn H. Brown, Editor, John Wiley and Sons, Inc., New York, 1971.
*The Bausch & Lomb ABBE–3L Refractometer, Operator's Manual*, cover and p. 8, *No Date.
American Standard Test Method (ASTM) D 542–95 * no date.
ASTM D 648 –95, no date.
ASTM D 1003 –95, no date.
ASTM D 2583 –95, no date.

*Primary Examiner*—Duc Truong
*Attorney, Agent, or Firm*—Irwin M. Stein; James R. Franks

[57] ABSTRACT

Describes a polymerizable organic composition comprising an aromatic monomer having at least two vinyl groups, e.g., divinyl benzene, a polythiol monomer having at least two thiol groups, e.g., pentaerythritol tetrakis(2-mercaptoacetate), and an anhydride monomer having at least one ethylenically unsaturated group, e.g., methacrylic anhydride. Polymerizable compositions according to the present invention, may optionally further comprise a polymerizable comonomer having at least two (meth)acryloyl groups, e.g., pentaerythritol tetrakis (acrylate). Polymerizates prepared from polymerizable organic compositions of the present invention have a refractive index of at least 1.57 and an Abbe number of at least 33. Also described are photochromic articles prepared from such compositions.

20 Claims, No Drawings

OPTICAL RESIN COMPOSITION

DESCRIPTION OF THE INVENTION

The present invention relates to polymerizable organic compositions and polymerizates having a refractive index of at least 1.57 and an Abbe number of at least 33 prepared from such compositions. More particularly, the present invention relates to certain polymerizable organic compositions comprising an aromatic monomer having at least two vinyl groups, a polythiol monomer and an anhydride monomer having at least one ethylenically unsaturated group.

A number of polymeric materials, e.g., plastics, have been developed as alternatives and replacements for glass in applications such as, optical lenses, fiber optics, windows and automotive, nautical and aviation transparencies. As used herein, the term 'glass' is meant to refer to silica-based inorganic glass. These polymeric materials can provide advantages relative to glass, including, shatter resistance, lighter weight for a given application, ease of molding and ease of dying. Representative examples of such polymeric materials include, poly(methyl methacrylate), polycarbonate and poly(diethylene glycol bis(allylcarbonate)).

The refractive indices of many polymeric materials are generally lower than that of glass. For example, the refractive index of poly(diethylene glycol bis(allylcarbonate)) is about 1.50, compared to that of high index glass, which can range, for example, from 1.60 to 1.80. When fabricating lenses to correct a given degree of visual defect, e.g., a correction for myopia, the use of a polymeric material having a lower refractive index will require a thicker lens relative to a material having a higher refractive index, e.g., high index glass. If the degree of correction required is substantial, e.g., in the case of severe myopia, a lens fabricated from a low index polymeric material can become so thick as to negate any benefit of reduction in weight relative to an equivalent degree of correction obtained from a higher refractive index lens, e.g., a high index glass lens. In addition, thicker optical lenses are not aesthetically desirable.

It is known that polymeric materials having refractive indices greater than 1.50 can be prepared from monomers containing halogens and/or sulfur atoms, e.g., as described in U.S. Pat. No. 5,484,872. The materials from which lenses, and in particular optical lenses, are fabricated can be categorized by their refractive indices. As is known to those of ordinary skill in the art, low indices typically include indices of refraction of from less than 1.50 through 1.53; middle indices comprise indices of refraction of from 1.54 through 1.57; and high indices commonly include indices of refraction of 1.58 and greater. Lenses prepared from polymeric materials having high refractive indices typically also have lower Abbe numbers (also known as nu-values). Lower Abbe numbers are indicative of an increasing level of chromatic dispersion, which is typically manifested as an optical distortion at or near the rim of the lens.

It is accordingly desirable then to prepare transparent polymerizates, in particular optical lenses that possess a combination of high refractive index and adequately high Abbe numbers, e.g., preferably at least 33 and more preferably at least 35. It is further desirable that these polymeric materials also possess physical properties, and in particular thermal properties, that are at least equivalent to and preferably better than those of lower index polymeric materials.

European patent publication number 598,551 A2 discloses a cross-linkable polymeric casting composition including an aromatic olefin monomer, e.g., divinyl benzene, and a di- or polythio compound, e.g., pentaerythritol tetrakis (3-mercaptopropionate). The casting composition is disclosed as further including a polymerizable comonomer selected from the group including di-, tri-, tetra- and higher acrylates or methacrylates, e.g., poly(ethylene glycol) dimethacrylate.

International patent publication number WO 96/38486 discloses a cross-linkable polymeric casting composition including an effective amount of an acrylic or methacrylic monomer which provides high rigidity and a high Abbe number to the final product, e.g., a tricyclodecane dimethanol diacrylate or methacrylate, a di- or polythio compound, e.g., pentaerythritol tetrakis(3-mercaptopropionate), a di- or polyvinyl monomer, e.g., divinyl benzene, and optionally a polymerizable comonomer, e.g., an epoxidised monomer or oligomer.

It has now been surprisingly discovered that substantially completely cured polymerizates prepared from polymerizable organic compositions of the present invention have a favorable balance of high refractive indices and adequately high Abbe numbers, and improved physical properties. In accordance with the present invention, there is provided a polymerizable organic composition comprising:

(a) an aromatic monomer having at least two vinyl groups;

(b) a polythiol monomer having at least two thiol groups; and (c) an anhydride monomer having at least one ethylenically unsaturated group. In accordance with the present invention, there is further provided a polymerizate of said polymerizable organic composition that has a refractive index of at least 1.57, as determined in accordance with American Standard Test Method (ASTM) number D542-95, and an Abbe number, i.e., a nu-value, of at least 33, as determined using an appropriate instrument, e.g., a Bausch & Lomb ABBE-3L Refractometer.

Other than in the operating examples, or where otherwise indicated, all numbers expressing quantities of ingredients or reaction conditions used herein are to be understood as modified in all instances by the term "about".

DETAILED DESCRIPTION OF THE INVENTION

The polymerizable organic compositions of the present invention include an aromatic monomer, e.g., substituted monocyclic and polycyclic aromatic hydrocarbons, having at least two vinyl groups. Examples of aromatic monomers that may be used in the polymerizable organic compositions of the present invention include, but are not limited to: divinyl benzene, e.g., 1,2-divinyl benzene, 1,3-divinyl benzene, 1,4-divinyl benzene and mixtures of structural isomers of divinyl benzene; diisopropenyl benzene, e.g., 1,2-diisopropenyl benzene, 1,3-diisopropenyl benzene, 1,4-diisopropenyl benzene and mixtures of structural isomers of diisopropenyl benzene; trivinyl benzene, e.g., 1,2,4-triethenyl benzene, 1,3,5-triethenyl benzene and mixtures of structural isomers of trivinyl benzene; divinyl naphthalene, e.g., 2,6-diethenyl naphthalene, 1,7-diethenyl naphthalene, 1,4-diethenyl naphthalene and mixtures of structural isomers of divinyl naphthalene; halogen substituted derivatives of divinyl benzene, diisopropenyl benzene, trivinyl benzene and divinyl naphthalene, e.g., 2-chloro-l,4-diethyenyl benzene; and mixtures of such aromatic monomers. In a particularly preferred embodiment of the present invention, the aromatic monomer is divinyl benzene.

In accordance with the present invention, the aforedescribed aromatic monomer is typically present in the polymerizable composition in an amount of at least 20% by weight, preferably at least 30% by weight, and more preferably at least 35% by weight, based on the total weight of the polymerizable organic composition. Also, the aromatic monomer is typically present in the composition in an amount of not greater than 80% by weight, preferably not greater than 65% by weight, and more preferably not greater than 50% by weight, based on the total weight of the polymerizable organic composition. The aromatic monomer may be present in an amount ranging between any combination of these values, inclusive of the recited values.

Polymerizable organic compositions in accordance with the present invention comprise also a polythiol monomer having at least two thiol groups. By "thiol group" is meant an —SH group which is capable of forming a covalent bond with an ethylenically unsaturated group, e.g., a vinyl group. Not intending to be bound by any theory, it is thought that covalent bonds are formed between the thiol groups and ethylenically unsaturated groups of the monomers of the present invention by means of a thiol-ene reaction mechanism, as it is known to those of ordinary skill in the art.

Examples of polythiol monomers suitable for use in the polymerizable organic compositions of the present invention include, but are not limited to, 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), polyethylene glycol di(2-mercaptoacetate), polyethylene glycol di(3-mercaptopropionate) and mixtures thereof.

In a particularly preferred embodiment of the present invention, the polythiol monomer is selected from the group consisting of 2,2'-thiodiethanethiol, pentaerythritol tetrakis (2-mercaptoacetate), pentaerythritol tetrakis(3-mercaptopropionate) and mixtures of such monomers.

The polythiol monomer is typically present in the polymerizable organic compositions of the present invention in an amount of at least 20% by weight, preferably at least 30% by weight, and more preferably at least 40% by weight, based on the total weight of the polymerizable organic composition. Also, the polythiol monomer is typically present in the composition in an amount of not greater than 60% by weight, preferably not greater than 55% by weight, and more preferably not greater than 50% by weight, based on the total weight of the polymerizable organic composition. The amount of the polythiol monomer present in the composition may range between any combination of these values, inclusive of the recited values.

Further included in the polymerizable organic compositions of the present invention is an anhydride monomer having at least one ethylenically unsaturated group which is radically polymerizable. Specific examples of suitable anhydride monomers include, but are not limited to, methacrylic anhydride, acrylic anhydride, maleic anhydride, 1-cyclopentene-1,2-dicarboxylic anhydride, itaconic anhydride and mixtures of such anhydride monomers.

The anhydride monomer is typically present in the polymerizable organic compositions of the present invention in an amount of at least 3% by weight, preferably at least 6% by weight, and more preferably at least 10% by weight, based on the total weight of the polymerizable organic composition. Also, the anhydride monomer is typically present in the composition in an amount of not greater than 40% by weight, preferably not greater than 35% by weight, and more preferably not greater than 30% by weight, based on the total weight of the polymerizable organic composition. The amount of anhydride monomer present in the composition may range between any combination of these values, inclusive of the recited values.

Polymerizable organic compositions in accordance with the present invention may optionally include a radically polymerizable comonomer having at least two (meth) acryloyl groups. As used herein, the term "(meth)acryloyl" is meant to refer to both acryloyl and methacryloyl groups. The polymerizable comonomer may be selected from the group consisting of:

(i) a monomer represented by the following general formula I,

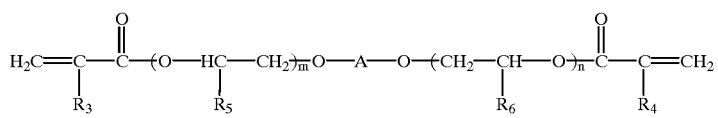

wherein m and n are each a positive number, the sum of m and n being from 0 to 70, preferably 2 to 40, and more preferably 5 to 20, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene (usually containing from 1 to 8 carbon atoms), cyclic alkylene (usually of 5 to 8 carbon atoms), phenylene, $C_1$–$C_9$ alkyl substituted phenylene, and a group represented by the following general formula II,

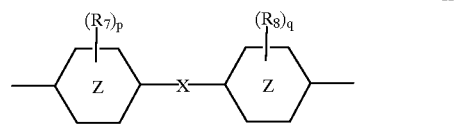

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —CH=CH—, —C($CH_3$)$_2$—, —C($CH_3$) ($C_6H_5$)— or

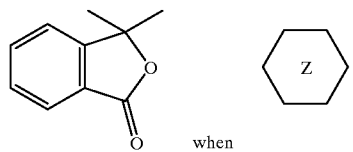 when is the divalent benzene group, and X is O, S, —CH$_2$—, or —C(CH$_3$)$_2$— when

is the divalent cyclohexane group;

(ii) a bis[(meth)acryloyl-terminated]poly(ethylene glycol) monomer, that is different than comonomer (i), having a number average molecular weight from 200 to 2000 grams/mole;

(iii) a poly(meth)acryloyl terminated monomer represented by the following general formula III,

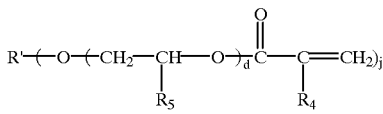

III wherein R' is a polyvalent radical of a polyol, and R$_4$ and R$_5$ have the same meaning as in general formula I, d is a number from 0 to 20, and j is a whole number from 3 to 6, preferably 3 to 4 and more preferably 3; and (iv) mixtures of polymerizable comonomers (i), (ii) and (iii).

The polymerizable comonomer (i) represented by general formula I may be prepared by methods that are well known in the art. One such commonly used method involves a two-step process, when the sum of m and n is greater than 0. In the first step, a polyol, e.g., 4,4'-isopropylidenediphenol, is reacted with an oxirane containing substance, for example ethylene oxide, propylene oxide, α-butylene oxide or β-butylene oxide, to form what is commonly referred to as an ethoxylated, propoxylated or butoxylated polyol having hydroxy functionality. In the second step, the ethoxylated, propoxylated or butoxylated polyol is esterified, or transesterified, with an alpha-beta unsaturated acid or ester such as methacrylic acid, an alkyl methacrylate, an acrylic acid, an alkyl acrylate, or a combination thereof. The second step results in the formation of the polymerizable comonomer represented by general formula I. When the sum of m and n is 0, polymerizable comonomer (i) may be prepared by esterifiying or transesterfying a polyol, e.g., 4,4'-isopropylidenediphenol, with an alpha-beta unsaturated acid or ester such as methacrylic acid, an alkyl methacrylate, an acrylic acid, an alkyl acrylate, or a combination thereof.

Examples of polyols suitable for use in preparing polymerizable comonomer (i) represented by general formula I, include, but are not limited to: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; cyclic alkylene diols such as 1,2-cyclohexanol, 1,3-cyclohexanol and 1,4-cyclohexanol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzenephenone; 4,4'-thiobisphenol; phenolphthlalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis (2,3,5,6-tetrachlorophenol); and biscyclohexanols, which can be prepared by hydrogenating the corresponding bisphenols, such as 4,4'-isopropylidene-biscyclohexanol; 4,4'-oxybiscyclohexanol; 4,4'-thiobiscyclohexanol; and bis(4-hydroxycyclohexanol)methane.

In a preferred embodiment of the present invention, with reference to general formulas I and II, X is —C(CH$_3$)$_2$—,

represents a divalent benzene group, p and q are each 0, R$_3$ and R$_4$ are each methyl, and the sum of m and n is from 5 to 20.

Polymerizable comonomer (ii) is different than comonomer (i) and can be prepared as is known in the art from an esterification or transesterification reaction between poly (ethylene glycol) and an alpha-beta unsaturated acid or ester such as methacrylic acid, an alkyl methacrylate, acrylic acid, an alkyl acrylate, or a combination thereof. The bis[(meth) acryloyl-terminated]poly(ethylene glycol) comonomer, preferably has a number average molecular weight from 200 to 1200, more preferably from 500 to 700, grams/mole, as determined by gel permeation chromatography using a polystyrene standard. A particularly preferred comonomer (ii) is a bismethacrylate of polyethylene glycol, having a number average molecular weight of 600 grams/mole.

Polymerizable comonomer (iii), as previously described with reference to general formula III, may be prepared by methods that are well known in the art. One such commonly used method involves a two step process, when d is greater than 0. In the first step, a polyol, e.g., trimethylolpropane, is reacted with an oxirane containing substance, for example ethylene oxide, propylene oxide, α-butylene oxide or β-butylene oxide to form what is commonly referred to as an ethoxylated, propoxylated or butoxylated polyol having hydroxy functionality. In the second step, the ethoxylated, propoxylated or butoxylated polyol is esterified, or transesterified, with an alpha-beta unsaturated acid or ester such as methacrylic acid, an alkyl methacrylate, acrylic acid, an alkyl acrylate, or a combination thereof. The second step results in the formation of polymerizable comonomer (iii). When d is 0, comonomer (iii) may be prepared by esterifiying or transesterfying a polyol, e.g., trimethylolpropane, with an alpha-beta unsaturated acid or ester such as methacrylic acid, an alkyl methacrylate, an acrylic acid, an alkyl acrylate, or a combination thereof.

Examples of polyols suitable for use in preparing polymerizable comonomer (iii) include, but are not limited to, glycerol, trimethylolpropane, 1,3, 5-tris(2-hydroxyethyl) isocyanurate, di-trimethylolpropane, pentaerythritol and dipentaerythritol. A particularly preferred polymerizable comonomer (iii) may be defined with reference to general formula III wherein R' is a radical of pentaerythritol, d is 0, j is 3 or 4 and $R_4$ is hydrogen.

As used herein, and with reference to general formula III, the phrase "R' is a polyvalent radical of a polyol" is meant to refer to the polyvalent residue of the polyol used in preparing polymerizable comonomer (iii). For example, in the case of pentaerythritol tetraacrylate (for which d is 0, j is four and $R_4$ is hydrogen) R' is the tetravalent radical of pentaerythritol, i.e., tetramethylenemethane. In the case of trimethylolpropane triacrylate (for which d is 0, j is 3 and $R_4$ is hydrogen) R' is the trivalent radical of trimethylolpropane, i.e., 1,1,1-trimethylenepropane.

When the polymerizable organic compositions of the present invention include polymerizable comonomer(s), the comonomer(s) is typically present in an amount of at least 1% by weight, preferably at least 3% by weight, and more preferably at least 5% by weight, based on the total, weight of said polymerizable organic composition. The polymerizable comonomer(s) may also be present in the composition in an amount of not greater than 20% by weight, preferably not greater than 15% by weight, and more preferably not greater than 10% by weight, based on the total weight of the polymerizable organic composition. The amount of the optional polymerizable comonomer(s) present in the composition may range between any combination of these values, inclusive of the recited values.

Polymerization of the polymerizable organic composition of the present invention may be accomplished by adding to the composition an initiating amount of material capable of generating free radicals, such as organic peroxy compounds or azobis(organonitrile) compounds, i.e., an initiator. Methods for polymerizing compositions having therein monomers containing radically polymerizable groups are well known to the skilled artisan and any of those well known techniques may be used to polymerize the aforedescribed polymerizable organic compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting polymerizate. A particularly preferred thermal initiator is 1,1-di-(t-butyl peroxy)-3,3,5-trimethylcyclohexane, which is commercially available from Nippon Oil and Fats Co., Ltd. under the tradename PERHEXA® 3M.

Examples of suitable azobis(organonitrile) compounds, that may be used as thermal polymerization initiators include: azobis(isobutyronitrile) and azobis(2,4-dimethylvaleronitrile).

The amount of thermal polymerization initiator used to initiate and polymerize the polymerizable organic compositions of the present invention may vary and will depend on the particular initiator used. Only that amount that is required to initiate and sustain the polymerization reaction is required, i.e., an initiating amount. With respect to the preferred peroxy compound, 1,1-di-(t-butyl peroxy)-3,3,5-trimethylcyclohexane, typically between 0.01 and 3.0 parts of that initiator per 100 parts of monomers present in the polymerizable organic composition (phm) may be used. More usually, between 0.05 and 1.0 phm is used to initiate the polymerization. Typically, the thermal cure cycle involves heating the polymerizable organic composition in the presence of the initiator from room temperature to 85° C. to 130° C. over a period of from 2 hours to 30 hours.

Photopolymerization of the polymerizable organic composition according to the present invention may be carried out in the presence of a photopolymerization initiator using ultraviolet light, visible light, or a combination thereof. Examples of suitable photopolymerization initiators include benzoin, benzoin methyl ether, benzoin isobutyl ether, benzophenone, acetophenone, 4,4'-dichlorobenzophenone, diethoxyacetophenone, 2-hydroxy-2-methyl-1-phenylpropan-1-one, 1-hydroxycyclohexyl phenyl ketone, 2-isopropylthixanthone and 2,4,6-trimethylbenzoyldiphenylphosphine oxide. The amount of photopolymerization initiator used to initiate and polymerize the polymerizable organic compositions of the present invention vary and will depend on the particular initiator used. Only that amount that is required to initiate and sustain the polymerization reaction is required, i.e., an initiating amount. A preferred photopolymerization initiator is 2,4,6-trimethylbenzoyldiphenylphosphine oxide. The photopolymerization initiator is typically used in an amount from 0.01% to 2% by weight, based on the total weight of monomer components.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal polymerization initiator or photopolymerization initiator and/or the consequent cure cycle should be adequate to produce a polymerizate according to the present invention which has a 15 second Barcol hardness of at least 1, preferably at least 4, e.g., from 4 to 35.

It should be understood that the polymerizable organic composition of the present invention may be polymerized in the absence of a polymerization initiator. In particular, photopolymerization of the polymerizable organic composition of the present invention may be achieved in the absence of any externally added photopolymerization or thermal initiators.

Various conventional additives may be incorporated with the polymerizable organic composition of the present invention. Such additives may include light stabilizers, heat stabilizers, antioxidants, ultraviolet light absorbers, mold release agents, static (non-photochromic) dyes, pigments, polymerization inhibitors to promote stability during storage, and ultraviolet light absorbers. Antiyellowing additives, e.g., 3-methyl-2-butenol, organo pyrocarbonates and triphenyl phosphite [CAS 101-02-0] may also be added to polymerizable organic compositions of the present invention to enhance resistance to yellowing.

It is also contemplated that a polymerization moderator, or mixtures of polymerization moderators, may be added to the polymerizable organic composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, alpha-methyl styrene, 2,4-diphenyl-4-methyl-l-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to the polymerizable organic composition of the present invention in an amount from 0.01% to 10% by weight, preferably from 0.1% to 8% by weight and more preferably from 0.3% to 5% by weight, based on the total weight of the polymerizable organic composition.

It is further contemplated that a flexibilizing additive having no free radical polymerizable groups, henceforth referred to as a nonpolymerizable flexibilizing additive, may be added to polymerizable organic compositions of the present invention. The nonpolymerizable flexibilizing additive, or mixtures of nonpolymerizable flexibilizing additives, may be added in an amount of from 0.05% to 15%, preferably from 0.5% to 10% and more preferably from 2% to 6% by weight, based on the total weight of the monomers and the weight of the nonpolymerizable flexibilizing additive(s). The nonpolymerizable flexibilizing additive may be nonaromatic or aromatic.

Examples of suitable nonpolymerizable flexibilizing additives include, alkoxylated phenol benzoate, alkoxylated naphthol benzoate, 1,3-bis(phenylthio)propane, bis (phenylthio) alkylene ether, the reaction product of phenyl chloroformate and dimercaptan, the reaction product of dimercaptan and phosgene endcapped with phenol, cinnamates, triphenyl phosphite, tri(2-ethylhexyl) trimellitate, triisodecyl trimellitate, poly(alkylene glycol) dinaphthoate, 2-ethylhexyl diphenylphosphate, isodecyl diphenyl phosphate, tricresyl phosphate, poly(alkylene glycol) dibenzoates, e.g., poly(ethylene glycol) dibenzoate and poly(propylene glycol) dibenzoate, esters of phthalic acid, isophthalic acid, and terephthalic acid, e.g., dioctyl phthalate, and a member represented by the following general formula IV:

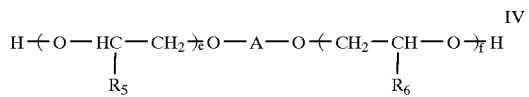

wherein e and f are each a positive number, the sum of e and f being from 0 to 70, preferably from 2 to 40, and more preferably from 5 to 35, $R_5$ and $R_6$ are each hydrogen or $C_1$, to $C_2$ alkyl, preferably hydrogen or methyl and A has the same meaning as in general formula I.

Examples of suitable polyols, for preparing nonpolymerizable flexibilizing additives represented by general formula IV wherein the sum of e and f is greater than 0, or for use as the nonpolymerizable flexibilizing additive wherein the sum of e and f is 0, include those described with respect to the first step of preparing polymerizable comonomer (i), exclusive of 4,4'-(1,2-ethenediyl)bisphenol.

A preferred nonpolymerizable flexibilizing additive may be defined with reference to general formula IV wherein the sum of e and f is from 25 to 35, $R_5$ and $R_6$ are each hydrogen, and A is a divalent linking group according to general formula II, wherein

represents a divalent benzene group, p and q are each 0 and X is $-C(CH_3)_2-$. Another preferred nonpolymerizable flexibilizing additive is poly(ethylene glycol) dibenzoate, the poly(ethylene glycol) precursor of which has a number average molecular weight of 100 to 1000 grams/mole.

Polymerizates obtained from polymerization of polymerizable organic compositions of the present invention will be solid and transparent. The polymerizates of the present invention will also have a refractive index of at least 1.57, preferably at least 1.58 and more preferably at least 1.60, and adequately high Abbe numbers, e.g., an Abbe number of at least 33 and preferably at least 35.

The monomers comprising the polymerizable organic composition of the present invention, i.e., the (a) aromatic, (b) polythiol and (c) anhydride monomers, are present in amounts sufficient to allow the preparation of a polymerizate therefrom, which possesses the above listed characteristics. For example, in a preferred embodiment of the present invention, the polymerizable organic composition comprises from 42% to 48% by weight of the aromatic monomer, e.g., divinyl benzene, from 42% to 48% by weight of the polythiol monomer, e.g., pentaerythritol tetrakis(2-mercaptoacetate), and from 4% to 16% by weight of the anhydride monomer, e.g., methacrylic anhydride, all based on the total weight of the composition. Solid articles that may be prepared from polymerizable organic compositions of the present invention include, but are not limited to, optical lenses, such as plano and ophthalmic lenses, sun lenses, windows, automotive transparencies, e.g., windshields, sidelights and backlights, and aircraft transparencies, etc.

When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic substances in the aforedescribed patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film; and applying the photochromic substance as part of a coating placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may added to the polymerizable organic compositions of the present invention prior to curing. However, when this is done it is preferred that the photochromic substance(s) be resistant to potentially adverse interactions with initiator(s) that may be present and/or the polythiol monomer and the sulfide linkages that form within the polymerizate. These adverse interactions can result in deactivation of the photochromic substance(s), e.g., by trapping them in either an open or closed form. Such photochromic substances include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the polymerizable organic compositions of the present invention prior to curing.

The present invention is more particularly described in the following examples, which are intended to be illustrative only, since numerous modifications and variations therein will be apparent to those skilled in the art. Unless otherwise specified, all parts and percentages are by weight.

EXAMPLES 1–7

Table 1 describes seven photo-polymerizable monomer compositions. Examples 1, 2 and 3 are representative of embodiments of the present invention, which include anhydride monomers having at least one ethylenically unsaturated group. Examples 4 through 7 are comparative examples.

TABLE 1

| | Example | | | | | | |
|---|---|---|---|---|---|---|---|
| Ingredients, Parts | 1 | 2 | 3 | 4 | 5 | 6 | 7 |
| DVB monomer[a] | 45 | 45 | 45 | 45 | 45 | 45 | 45 |
| PTMA monomer[b] | 45 | 45 | 45 | 45 | 45 | 45 | 45 |
| MA monomer[c] | 10 | 0 | 0 | 0 | 0 | 0 | 0 |
| maleic anhydride | 0 | 10 | 0 | 0 | 0 | 0 | 0 |
| itaconic anhydride | 0 | 0 | 10 | 0 | 0 | 0 | 0 |
| PETriA monomer[d] | 0 | 0 | 0 | 10 | 0 | 0 | 0 |
| DiPETHA monomer[e] | 0 | 0 | 0 | 0 | 10 | 0 | 0 |
| PETetraA monomer[f] | 0 | 0 | 0 | 0 | 0 | 10 | 0 |
| EGDMA monomer[g] | 0 | 0 | 0 | 0 | 0 | 0 | 10 |

[a]divinylbenzene monomer having a purity of 93% by weight.
[b]pentaerythritol tetrakis(2-mercaptoproacetate) monomer.
[c]methacrylic anhydride monomer.
[d]pentaerythritol triacrylate monomer.
[e]dipentaerythritol hexacrylate monomer.
[f]pentaerythritol tetraacrylate monomer.
[g]ethyleneglyocol dimethacrylate monomer.

Cast sheets of the polymerizable monomer compositions of Table 1 were made in the following manner. Each monomer composition was added to a suitable vessel and mixed using a magnetic stir plate and magnetic stir bar at ambient temperature. The mixed monomer compositions were then poured into ultraviolet (UV) light transmissive glass molds having interior dimensions of 15.24×15.24× 0.32 cm.

The contents of the filled molds were cured in the following manner. (1) A filled mold was passed several times beneath a UV light source until its contents were observed by visual inspection to have gelled. (2) Each 15.24×15.24 cm side of the glass mold was next passed an additional four times beneath the UV light source. (3) The mold was then placed in a 120° C. electric oven for one hour. The UV light source used was a FUSION SYSTEMS® D-Bulb, which was positioned at a distance of 15 cm (6 inches) above the glass molds. The glass molds were passed beneath the UV light source at a linear rate of 91 cm (3 ft)/minute using a model no. C636R conveyor belt system available commercially from LESCO Inc. A single pass beneath the UV light source as described was found to impart 4.9 Joules/cm$^2$ of UV energy to the interior of the glass molds used. Physical properties of the cast sheets were measured and the results are summarized in Table 2.

TABLE 2

Physical Data

| Physical Test | Example | | |
|---|---|---|---|
| | 1 | 2 | 3 |
| Heat Distortion Temperature (° C. at 10 mils)$^h$ | 65 | 75 | 61 |
| Total Deflection Temperature (° C. at 100 mils)$^i$ | 130$^j$ | 101 | 75 |
| Refractive Index$^k$ ($n_D^{20}$) | 1.5990 | 1.6014 | 1.5994 |
| Abbe Number$^l$ | 35 | 34 | 34 |
| % Transmittance$^m$ | 91.7 | 91.1 | 91.9 |
| % Haze$^n$ | 1.3 | 1.3 | 3.5 |
| Density at 22° C. (g/cc) | 1.26 | 1.29 | 1.26 |
| % Conversion$^o$ | 91.1 | N.D.$^1$ | N.D. |

| Physical Test | Example | | | |
|---|---|---|---|---|
| | 4 | 5 | 6 | 7 |
| Heat Distortion Temperature (° C. at 10 mils)$^h$ | 44 | 39 | 37 | 45 |
| Total Deflection Temperature (° C. at 100 mils)$^i$ | 59 | 50 | 47 | 64 |
| Refractive Index$^k$ ($n_D^{20}$) | 1.5996 | 1.5999 | 1.6000 | 1.5986 |
| Abbe Number$^l$ | 35 | 34 | 33 | 34 |
| % Transmittance$^m$ | 91.5 | 91.6 | 91.6 | 91.7 |
| % Haze$^n$ | 2.1 | 1.5 | 3.2 | 1.6 |
| Density at 22° C. (g/cc) | 1.29 | 1.26 | 1.26 | 1.26 |
| % Conversion$^o$ | 86.5 | 86.8 | 83.2 | 88.3 |

$^1$N.D. = Not Determined
$^h$Heat Distortion Temperature is the temperature at which the test specimen was observed to have a deflection of 10 mils (254 microns), and was determined in accordance with ASTM D 648-95 using a Custom Scientific Instruments Model HDV3 DTUL/Vicat Softening Point Apparatus.
$^i$Total Deflection Temperature is the temperature at which the test specimen was observed to have a deflection of 100 mils (2540 microns), and was determined in accordance with ASTM D 648-95 using a Custom Scientific Instruments Model HDV3 DTUL/Vicat Softening Point Apparatus.

TABLE 2-continued

Physical Data $^j$The Total Deflection Temperature value of Example 1 represents a deflection of 96.1 mils at a temperature of 130° C.
$^k$Refractive Index $n_D^{20}$ was determined in accordance with ASTM D542-95, using a Bausch & Lomb ABBE-3L Refractometer.
$^l$Abbe number (also known as nu-value) was measured using a Bausch & Lomb ABBE-3L Refractometer.
$^m$Percent Transmittance was determined in accordance with ASTM D 1003-95, using a HunterLab model ColorQuest II spectrophotometer.
$^n$Percent Haze was determined in accordance with ASTM D 1003-95 using a HunterLab model ColorQuest II spectrophotometer.
$^o$Percent conversion of C=C double bonds to saturated C—C bonds was determined using a Mattson SIRUS 100 Fourier Transform Infrared (FTIR) instrument. A liquid sample of the uncured polymerizable organic composition was placed in a 2 millimeter (mm) thick quartz cell and the peak area at a wavelength of 1.63 microns was measured. The thickness and peak area at a wavelength of 1.63 microns were measured for a fully cured cast sheet corresponding to the liquid sample. The two sets of measurements were used in the following equation to calculate the percent conversion: 100 × {[(peak area/mm)$_{liquid\ sample}$ − (peak area/mm)$_{cast\ sheet}$]/(peak area/mm)$_{liquid\ sample}$}.

EXAMPLES 8 AND 9

Table 3 describes two thermally-polymerizable monomer compositions. Example 8 is representative of an embodiment of the present invention, which includes methacrylic anhydride. Example 9 is a comparative example.

TABLE 3

| | Example | |
|---|---|---|
| Ingredients, Parts | 8 | 9 |
| DVB monomer$^a$ | 45.5 | 45.5 |
| PTMA monomer$^b$ | 45.5 | 45.5 |
| MA monomer$^c$ | 9 | 0 |
| EGDMA monomer$^g$ | 0 | 9 |
| LUPERSOL ® 231 Initiator$^p$ | 0.4 | 0.4 |

$^p$LUPERSOL ® 231 Initiator chemically is 1,1-di(tert-butylperoxy)-3,3,5-trimethylcyclohexane, Chemical Abstracts No. (CAS No.) 6731-36-8, and is available commercially from Elf Atochem.

Cast sheets of the polymerizable monomer compositions of Table 3 were made in the following manner. Each monomer composition was transferred to a suitable vessel and the LUPERSOL® 231 Initiator was added. The resulting initiated polymerizable monomer composition was mixed using a magnetic stir plate and magnetic stir bar at 50° C. The mixed monomer compositions were then poured into glass molds having interior dimensions of 15.24×15.24× 0.32 cm. The filled molds were thermally cured according to the thermal cure cycle detailed in Table 4. Physical properties of the cast sheets were measured and the results are summarized in Table 5.

TABLE 4

Thermal Cure Cycle For Examples 9 and 10

| Cumulative Hours | Oven Temperature ° C. |
|---|---|
| 0 | 50 |
| 15 | 125 |
| 16 | 125 |
| 18.5 | 80 (end of cycle) |

*The rate of temperature change represented in Table 4 was, in all instances, linear and continuous without any temperature holds.

TABLE 5

Physical Data

| Physical Test | Example 8 | Example 9 |
|---|---|---|
| Heat Distortion Temperature (° C. at 10 mils)[h] | 102 | 87 |
| Total Deflection (mils) @ 130° C.[q] | 42 | 50 |
| Barcol Hardness (0 Seconds)[r] | 43 | 42 |
| Barcol Hardness (15 seconds)[r] | 41 | 39 |
| Refractive Index[k] ($n_D^{20}$) | 1.5973 | 1.5974 |
| Abbe Number[l] | 35 | 35 |
| % Transmittance[m] | 91 | 91 |
| Density at 22° C. (g/cc) | 1.262 | 1.262 |

[q]Total Heat Distortion at 130° C., was determined in accordance with ASTM D 648-95 using a Custom Scientific Instruments Model HDV3 DTUL/Vicat Softening Point Apparatus.
[r]Barcol Hardness was determined in accordance with ASTM - D 2583-95, taking scale readings immediately after the Barcol impresser point penetrated the specimen, and 15 seconds thereafter.

The data of Tables 2 and 5 shows that polymerizates obtained by either UV-curing or thermal-curing of polymerizable monomer compositions of the present invention have improved thermal properties, i.e., heat distortion temperature, coupled with high refractive indices and Abbe numbers, relative to the comparative compositions of Examples 4 through 7 and 9. The percent conversion data presented in Table 2 indicates that a higher level of C=C double bond conversion can be obtained with a polymerizable organic composition according to the present invention, i.e., Example 1, relative to comparative compositions, i.e., comparative Examples 4 through 7.

The present invention has been described with reference to specific details of particular embodiments thereof. It is not intended that such details be regarded as limitations upon the scope of the invention except insofar as and to the extent that they are included in the accompanying claims.

We claim:

1. A polymerizable organic composition comprising:

(a) an aromatic monomer having at least two vinyl groups;

(b) a polythiol monomer having at least two thiol groups; and (c) an anhydride monomer having at least one ethylenically unsaturated group, provided that a polymerizate of said polymerizable organic composition has a refractive index of at least 1.57 and an Abbe number of at least 33.

2. The polymerizable organic composition of claim 1 wherein said aromatic monomer is selected from the group consisting of divinyl benzene, diisopropenyl benzene, trivinyl benzene, divinyl naphthalene, halogen substituted derivatives of divinyl benzene, diisopropenyl benzene, trivinyl benzene and divinyl naphthalene, and mixtures thereof.

3. The polymerizable organic composition of claim 2 wherein said aromatic monomer is divinyl benzene.

4. The polymerizable organic composition of claim 1 wherein said polythiol monomer is selected from the group consisting of 2,2'-thiodiethanethiol, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate) and mixtures of such polythiol monomers.

5. The polymerizable organic composition of claim 1 wherein said anhydride monomer is selected from the group consisting of methacrylic anhydride, acrylic anhydride, maleic anhydride, 1-cyclopentene-1,2-dicarboxylic anhydride, itaconic anhydride and mixtures thereof.

6. The polymerizable organic composition of claim 1 wherein said aromatic monomer is present in an amount of from 20% to 80% by weight, based on the total weight of said polymerizable organic composition, said polythiol monomer is present in an amount of from 20% to 60% by weight, based on the total weight of said polymerizable organic composition, and said anhydride monomer is present in an amount of from 3% to 40% by weight, based on the total weight of said polymerizable organic composition.

7. The polymerizable organic composition of claim 5 wherein said anhydride monomer is methacrylic anhydride.

8. The polymerizable organic composition of claim 7 wherein said aromatic monomer is divinyl benzene and said polythiol monomer is selected from the group consisting of 2,2'-thiodiethanethiol, pentaerythritol tetrakis(3-mercaptopropionate), pentaerythritol tetrakis(2-mercaptoacetate) and mixtures of such polythiol monomers.

9. The polymerizable organic composition of claim 8 wherein divinyl benzene is present in an amount of from 30% to 65% by weight, based on the total weight of said polymerizable organic composition, said polythiol monomer is present in an amount of from 30% to 55% by weight, based on the total weight of said polymerizable organic composition, and methacrylic anhydride is present in an amount of from 6% to 35% by weight, based on the total weight of said polymerizable organic composition.

10. The polymerizable organic composition of claim 1 further comprising a radically polymerizable comonomer having at least two (meth)acryloyl groups.

11. The polymerizable organic composition of claim 10 wherein said radically polymerizable comonomer is selected from the group consisting of:

(i) a monomer represented by the following general formula,

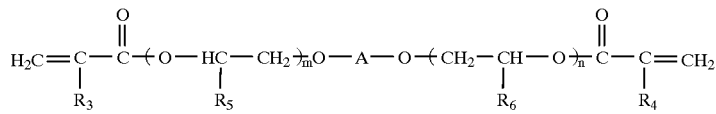

wherein m and n are each a positive number, the sum of m and n being from 0 to 70, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene, cyclic alkylene, phenylene, $C_1$–$C_9$ alkyl substituted phenylene, and a group represented by the following general formula,

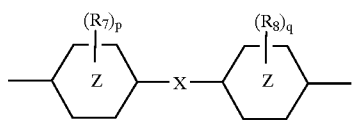

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$) (C$_6$H5)— or

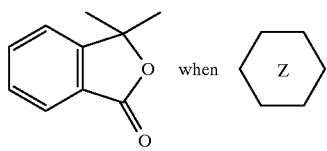

is the divalent benzene group, and X is O, S, —CH$_2$—, or —C(CH$_3$)$_2$— when

is the divalent cyclohexane group;

(ii) a bis[(meth)acryloyl-terminated]poly(ethylene glycol) monomer, that is different than monomer (i), having a number average molecular weight from 200 to 2000 grams/mole;

(iii) a poly(meth)acryloyl terminated monomer represented by the following general formula,

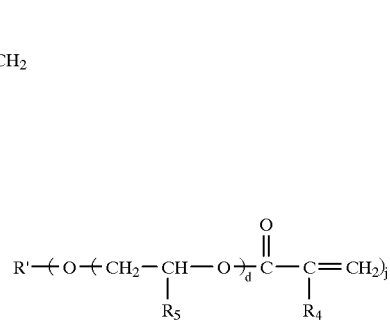

wherein R' is a polyvalent radical of a polyol, $R_4$ is hydrogen or methyl, $R_5$ is hydrogen or $C_1$ to $C_2$ alkyl, d is a number from 0 to 20, and j is a whole number from 3 to 6; and (iv) mixtures of polymerizable comonomers (i), (ii) and (iii).

12. The polymerizable organic composition of claim 11 wherein X is —C(CH$_3$)$_2$—,

represents a divalent benzene group, p and q are each 0, $R_3$ and $R_4$ are each methyl, the sum of m and n is from 0 to 20, R' is a radical of pentaerythritol, j is 3 and d is 0.

13. The polymerizable organic composition of claim 12 wherein said radically polymerizable comonomer is monomer (iii) and is present in an amount of from 1% to 20% by weight, based on the total weight of said polymerizable organic composition.

14. The polymerizate of claim 1.

15. The polymerizate of claim 9.

16. The polymerizate of claim 11.

17. A photochromic article comprising:
 (a) the polymerizate of claim 1; and
 (b) a photochromic amount of organic photochromic substance.

18. A photochromic article comprising:
 (a) the polymerizate of claim 9; and
 (b) a photochromic amount of organic photochromic substance.

19. The photochromic article of claim 18 wherein the organic photochromic substance is selected from the group consisting of spiro(indoline)naphthoxazines, spiro(indoline)benzoxazines, benzopyrans, naphthopyrans, chromenes, organo-metal dithizonates, fulgides and fulgimides and mixtures of such organic photochromic substances.

20. A photochromic article comprising:
 (a) the polymerizate of claim 11; and
 (b) a photochromic amount of organic photochromic substance.

* * * * *